United States Patent [19]

Gwon

[11] Patent Number: 4,711,410
[45] Date of Patent: Dec. 8, 1987

[54] REEL-DRIVING DEVICE FOR A VIDEOCASSETTE RECORDER

[75] Inventor: Seong T. Gwon, Seoul, Rep. of Korea

[73] Assignee: Gold Star Co., Ltd., Seoul, Rep. of Korea

[21] Appl. No.: 878,603

[22] Filed: Jun. 26, 1986

[30] Foreign Application Priority Data

Jun. 26, 1985 [KR] Rep. of Korea ............ 7727/1985[U]

[51] Int. Cl.⁴ .......................... G03B 1/04; G03B 1/40; B65H 20/36
[52] U.S. Cl. ..................................... 242/201; 242/200
[58] Field of Search ............... 242/179, 191, 196, 200, 242/201, 202, 205, 206-208

[56] References Cited

U.S. PATENT DOCUMENTS

| 3,130,934 | 4/1964 | Richt et al. | 242/201 |
| 3,938,758 | 2/1976 | Totino | 242/201 |
| 4,036,458 | 7/1977 | Matthey et al. | 242/201 |

Primary Examiner—Donald Watkins
Attorney, Agent, or Firm—Birch, Stewart, Kolasch & Birch

[57] ABSTRACT

A reel-driving device for a videocassette recorder which comprises a clutch disposed between a supply reel and a take-up reel in order to transmit a drive force from a power source to a selected one of the reels via an idler pivotly mounted to the clutch, the radius ratio between the supply reel and the take-up reel being set at about 1.27–1.5:1 so that each reel generates a predetermined value of torque suitable to carry out a satisfied function thereof in each operating mode.

2 Claims, 7 Drawing Figures

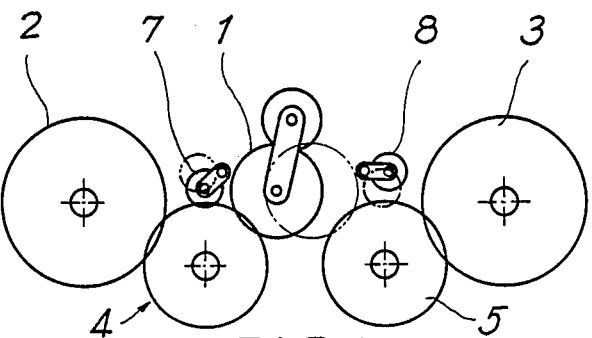
FIG. 1 PRIOR ART
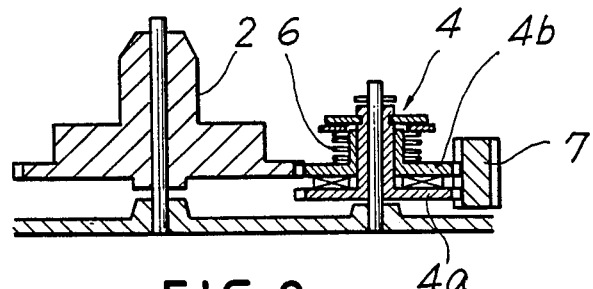
PRIOR ART  FIG. 2
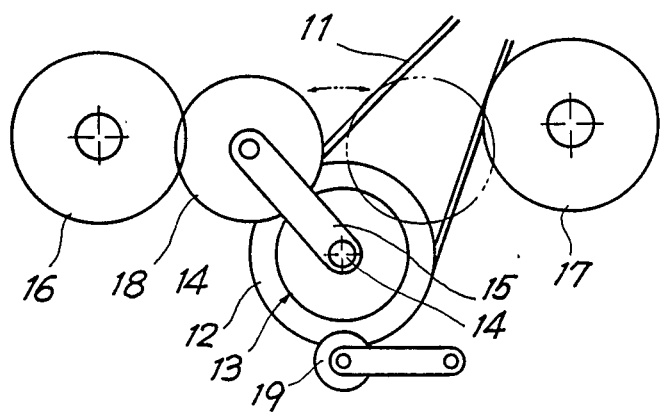
FIG. 3 PRIOR ART

REEL-DRIVING DEVICE FOR A VIDEOCASSETTE RECORDER

BACKGROUND OF THE INVENTION

The present invention relates to a reel-driving device for videocassette recorder using video cassettes, and particularly to a reel-driving device having a simple construction providing basic functions thereof and enabling the manufacture thereof to be inexpensive.

Generally, a videocassette recorder (hereinafter, referred to as a VCR) includes two reels, that is, a supply reel and a take-up reel, in order to travel a tape in a normal or reverse direction. The VCR is properly operated in various operating modes, for example, a playback mode(PB), a fast forwarding mode(FF), a reviewing mode(REW), a normal searching mode(CUE), a reverse searching mode(REV), a reverse play-back mode(R-PB), a slow play-back mode(SLOW), and a frame advancing mode(FRAME AVD).

In a ½ inch VHS-type VCR, for example, a take-up reel needs a torque of about 150 g. Cm in PB, SLOW, CUE, AND FRAME AVD modes as above-mentioned. In R-PB and REV modes, a supply reel needs a torque of about 200 g. Cm. In FF and REW modes, both supply reel and take-up reel require a torque of about 400 g. Cm.

Thus, the torque of each reel has to be varied depending upon the required operating mode. As in the case of VHS-type, such variation of torque is encountered in all VCR having a construction provided with a supply reel and a take-up reel, although the degree of variation thereof may be more or less different from that of VHS-type VCR.

Hereinbefore, there has been several methods for carrying out the above-mentioned function. FIGS. 1 and 2 show an example of conventional reel-driving devices, wherein a drive idler 1 can rotate according to PB or R-PB modes, as respectively indicated by the solid line and the atom line in FIG. 1. The drive force of the idler 1 can be transmitted to a supply reel 2 via an intermediate clutch 4 disposed between the idler 1 and the supply reel 2, or to a take-up reel 3 via an intermediate clutch 4 disposed between the idler 1 and the take-up reel 3. The clutches 4 and 5 are provided with springs exhibiting different spring forces, respectively. Thus, torques of the supply reel 2 and the take-up reel 3 are different from each other. In detail, the clutch 4 associated with the supply reel 2 uses a spring 6 exhibiting a spring force higher than that of a coil spring (not shown) used in the take-up reel 3, so that torques of the supply reel 2 and the take-up reel 3 can be differently provided. In REW mode, a larger torque is required. To this end, an input gear 4a and an output gear 4b engage with each other via a connecting gear 7 as shown in FIG. 2, so that a drive force transmitted from a drive motor via the idler 1 can be directly transmitted to the supply reel 2. In a FF mode, a connecting gear 8 associated with the intermediate clutch 5 has a function identical to that of the connecting gear 7, so that the drive force of the drive motor is directly transmitted to the take-up reel 3. In this case, connecting gears 7 and 8 operate at positions indicated by the atom line and the solid line in FIG. 1, by means of function plates, respectively, although the connection between each connecting gear and each function plate is not shown in FIG. 1.

Although the reel-driving device can properly function depending upon the variation of torque, there is a problem that the device has a complicated construction using two intermediate clutches and two connecting gears.

As another example of conventional reel-driving devices, there is a construction using one clutch mechanism. This consturction is shown in FIGS. 3 and 4. In this case, a clutch 13 receives the power from a power source (not shown) by means of a belt 11 and a pulley 12. The clutch 13 engages with a idler 18 which is operatably connected to the clutch 13 by means of a connecting lever 15 to pivot about the axis 14 of said clutch so that a torque is selectively transmitted to a supply reel 16 or a take-up reel 17. In this case, the torque of the supply reel 16 is the same as that of the take-up reel 17. In FF or REW modes, both gears 13a and 13b of the clutch 13 are engaged with a connecting gear 19, in order to remove the clutch function and to provide a direct transmission of the torque, as in the case of FIG. 1.

Although having a simple construction, such reel-driving device does not include a means for adjusting the torques of reels to the desired values, for example, 200 g. Cm in the case of the supply reel 16 and 150 g. Cm in the case of the take-up reel 17, respectively. In this device, the torques of the reels 16 and 17 are set at about 170 to 180 g.Cm, as different from the desired values. As a result, the required functions of the reel driving device can not be satisfactorily obtained.

FIG. 5 shows a further example of conventional reel-driving device wherein a clutch means is removed and a motor 21 for reels directly drives a supply reel 23 and a take-up reel 24 via an idler 22. In this case, a rotational torque of the motor 21 is electrically controlled so that the generated torque corresponds to each operating mode. Although providing a simple construction and high reliance, this device has a disadvantage of increasing the cost of manufacture due to the use of an expensive high efficiency motor driving in a wide range of velocity and a servo circuit for adjusting a torque in each operating mode.

As still another conventional reel-driving device, there is an arrangement wherein a supply reel and a take-up reel are independently driven by respective motors. The operation of each motor is controlled by a micro computer in order to provide a desired torque, thereby enabling a precise control of the tape-tension. However, this device has not been commonly utilized except for particular purposes, due to the necessity of using two expensive motors and a complicated control circuit.

SUMMARY OF THE INVENTION

Therefore, an object of the present invention is to provide a reel-driving device satisfied in terms of the cost and the function, in order to overcome the disadvantages encountered in the above-mentioned conventional devices.

In accordance with the present invention, this object is accomplished by providing a reel-driving device for a videocassette recorder comprising a supply reel, a take-up reel, a clutch disposed between said reels and adapted to receive a drive force from a power source, an idler pivotly mounted to said clutch to selectively transmit the drive force from said clutch to one of said reels, the device being characterized in that the radius ratio of the supply reel to the take-up reel is set at about 1.27–1.5:1, so that each reel generates a predetermined value of torque suitable to carry out a satisfied function thereof in each operating mode, such as a playback mode, a cueing mode, a reverse play-back mode, or a reviewing mode.

In this arrangement the radiuses of the supply reel and the take-up reel are different from each other by a desired ratio, so that the reels rotate by respective predetermined torques irrespective of a constant drive force from the clutch, thereby enabling the function of each reel to be smoothly carried out.

The present invention can be more fully understood from the following detailed description when taken in conjunction with the accompanying drawings.

BRIEF DESCRIPTION OF THE DRAWINGS

FIGS. 1 and 2 are a front plan view and a sectional view of an a prior art reel-driving devices, respectively;

FIGS. 3 and 4 are a front plan view and a sectional view of another prior art reel-driving device, respectively;

DETAILED DESCRIPTION OF THE PREFERRED EMBODIMENTS

Figure 4:
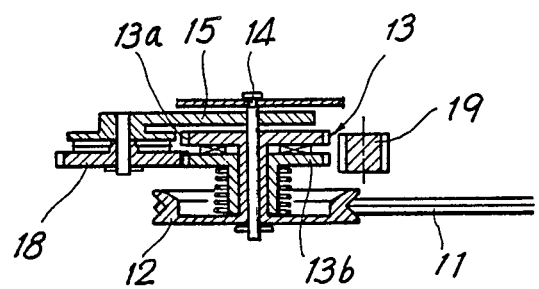
Figure 5:
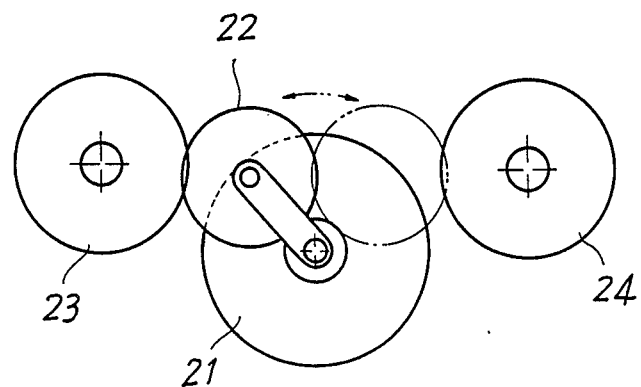
FIG. 5 is a front plan view of a further prior art reel-driving device.
Figure 6:
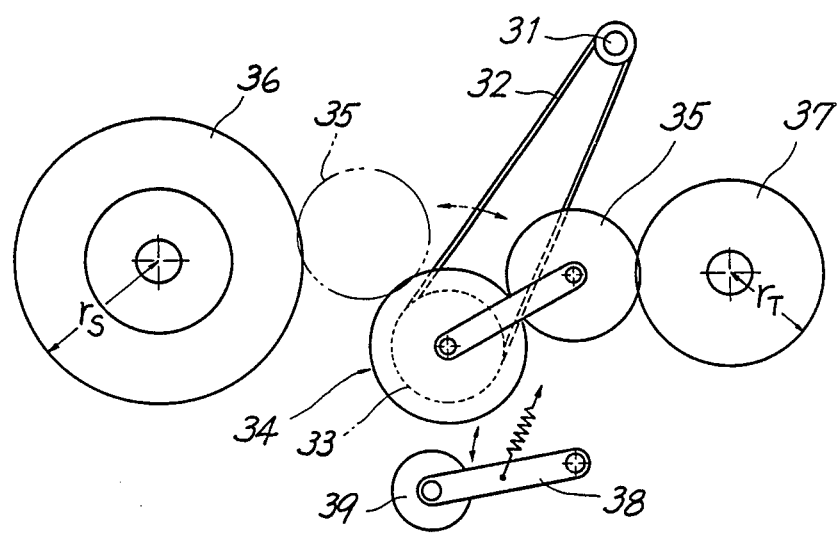
FIGS. 6 and 7 are a plan view and a sectional view of a reel-driving device in accordance with the present invention.
Figure 7:
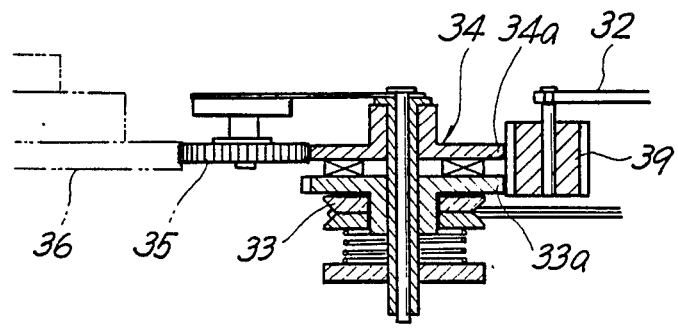

Referring to FIGS. 6 and 7, the reel-driving device in accordance with the present invention is shown, wherein a rotational force of a pulley 31 connected to a power source (not shown) is transmitted to a pulley 33 via a belt 32. The pulley 33 has an input gear 33a to which an output gear 34a of a clutch 34 is engaged, in order to receive the rotational force from the pulley 33. At both sides of the pulley 33, a supply reel 36 and a take-up reel 37 are disposed, respectively, so as to receive the rotational force of the pulley 33 transmitted via the clutch 34, by means of a idler 35 which always engages with the clutch 34 and pivots about the center of the clutch 34 by means of a connecting lever to selectively engage with the supply reel 36 or the take-up reel 37. Selectively, the input gear 33a of the pulley 33 can be directly connected with an output gear 34a of the clutch 34 by means of a connecting gear 39 which can be pivoted, by means of a lever 38, to engage with both gears 33a and 34a. In accordance with the present invention, the ratio of the radius $r_S$ of the supply reel 36 to the radius $r_T$ of the take-up reel 37 is 1.27–1.5:1 so that the torque ratio between the supply reel 36 and the take-up reel 37 is 1.27–1.5:1.

In this arrangement, since the rotational force from the pulley 31 transmitted to the pulley 33 is transmitted the output gear 34a of the clutch 34 via the input gear 33a of the pulley, in a well-known clutch-type manner, the rotational torque of the output gear 34 is constant irrespective of the variation of the torque of drive motor, as well-known by a skilled man in this field.

Since the radius ratio between the supply reel 36 and the take-up reel 37 is set at 1.27–1.5:1, in accordance with the present invention, the rotational torque of the supply reel 36 is proportionally larger than that of the take-up reel 37.

Generally, the desired torque ratio between the supply reel 36 and the take-up reel 37 is 1.27:1 in the VHS-type VCR. Where the radius ratio between the supply reel and the take-up reel is set at 1.27:1, in order to provide the torque ratio of 1.27:1, therefore, the take-up reel 37 of a small diameter can generates a desired torque in PB, SLOW, CUE, FRAME AVD modes by engaging with the idler 35 as indicated by the solid line in FIG. 6, and the supply reel 36 of a large diameter can generates a desired torque in R-PB and REV modes by engaging with the idler 35 as indicated by the atom line as shown in FIG. 6.

In this case, the rotational velocity of the reel in the REV mode is lower than that of the reel in the CUE mode. However, there is no problem if the rotational velocity of the drive pulley 31 in the REV mode is increased by 1.27 times of that in the CUE mode.

In FF and RE modes, the connecting gear 39 is engaged with the clutch mechanism by the pivoting operation of the lever 38 as shown in FIG. 7, so that the clutch function is lost and the drive force is directly transmitted to the reel, thereby enabling the reel to rotate by a high torque.

As described hereinbefore, the radiuses of the supply reel and the take-up reel are different from each other by a desired ratio, in accordance with the present invention, so that the reels rotate by respective predetermined torques. Accordingly, there are advantages that inexpensive reel-driving mechanism can be designed and that the function of each reel can be smoothly carried out.

What is claimed is:

1. A reel-driving device for a videocassette recorder which comprises:
    a supply reel for supplying a tape,
    a take-up reel for taking up the tape, said take-up reel being provided with a diameter which is larger than a diameter of said supply reel,
    a clutch disposed between said supply reel and said take-up reel for varying driving force transmitted from a pulley to meet an evenly required torque, and
    an idler transmitting the evenly varied driving force alternatively to said supply reel or said take-up reel whereby the supply reel or take-up reel drives the tape to record, with the revolution torque required in each of a CUE (forward search) and REVIEW (backward search) mode of the videocassette recorder.

2. The reel-driving device of claim 1, wherein the diameters of the supply reel and the take-up reel are provided in a ratio of from about 1.27–1.5:1, whereby in the CUE and REVIEW mode, the revolution torques of the supply reel and the take-up reel are provided in a ratio of from about 1.27–1.5:1.

* * * * *